United States Patent
Liasi et al.

(10) Patent No.: US 6,738,507 B2
(45) Date of Patent: May 18, 2004

(54) APPARATUS AND METHOD FOR CORRELATING PART DESIGN GEOMETRY, MANUFACTURING TOOL GEOMETRY, AND MANUFACTURED PART GEOMETRY

(75) Inventors: Evangelos Liasi, Ontario (CA); Jing Wu, Canton, MI (US); Cathy Bingfeng Xi, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 615 days.

(21) Appl. No.: 09/757,174

(22) Filed: Jan. 9, 2001

(65) Prior Publication Data

US 2002/0090130 A1 Jul. 11, 2002

(51) Int. Cl.[7] ................................................. G06K 9/00
(52) U.S. Cl. ......................... 382/152; 382/154; 700/175
(58) Field of Search ................................. 382/152–154; 348/92–93, 130; 356/237.4; 250/559.39, 559.46; 702/34, 40; 700/175

(56) References Cited

U.S. PATENT DOCUMENTS

| | | | |
|---|---|---|---|
| 4,845,763 A | * 7/1989 | Bandyopadhyay et al. | . 382/152 |
| 5,027,281 A | 6/1991 | Rekow et al. | |
| 5,414,647 A | 5/1995 | Ebenstein et al. | |
| 5,790,400 A | * 8/1998 | Higuchi | ...................... 382/152 |
| 5,848,115 A | 12/1998 | Little et al. | |
| 6,304,680 B1 | * 10/2001 | Blake et al. | ................. 382/285 |
| 6,414,711 B2 | * 7/2002 | Arimatsu et al. | ............. 348/86 |

\* cited by examiner

Primary Examiner—Bhavesh M. Mehta
Assistant Examiner—John Strege
(74) Attorney, Agent, or Firm—Damian Porcari

(57) ABSTRACT

Apparatus and method useful in the process of making a forming tool, such as metal stamping tool. The apparatus (20, 22) performs a method of scanning a working surface (18) of a tool part (14) with an optical shape measurement camera (22) to obtain electronic images from different views of the working surface, and then processing the electronic images to develop a first set of data defining the three-dimensional shape of the working surface. The first set of data is then processed with a second set of data having a correlation with the shape of the working surface to develop a third set of data defining differences between the first and second sets of data. The second set of data may define the shape of a part formed by the tool or the master shape of the part.

17 Claims, 2 Drawing Sheets

APPARATUS AND METHOD FOR CORRELATING PART DESIGN GEOMETRY, MANUFACTURING TOOL GEOMETRY, AND MANUFACTURED PART GEOMETRY

REFERENCE TO A RELATED APPLICATION AND INCORPORATION BY REFERENCE

The full content of a pending application entitled APPARATUS AND METHOD FOR CHECKING THE SHAPE OF A MANUFACTURED PART, Ser. No. 09/663406, filed Sep. 15, 2000 (Attorney Docket No. 199-1197), is incorporated herein by reference.

BACKGROUND OF THE INVENTION

1. Field of the Invention

This invention relates to apparatus and method for correlating the geometry of a manufactured part, the geometry of a tool for manufacturing the part, and the geometry of the master design of the part toward the objectives of more efficiently making and maintaining the tool and more efficiently designing and making other tools.

2. Background Information

Dimensional accuracy of manufactured parts is a vital aspect of mass-production techniques. For example, the body of an automotive vehicle comprises a number of individual body panels that fit together. Dimensional inaccuracies in such parts may lead to poor fits that could distract from appearance and/or impair function. Such a body panel is typically a formed metal part or a formed synthetic or composite part. One example of a formed metal part is a metal stamping fabricated by metal stamping machines that perform metal stamping processes. Processes other than stamping may be used to form metal parts. Molding processes may be used to form synthetic or composite parts.

Common to such processes is the presence of a tool having a surface that imparts a similar shape to the manufactured part. Because of the nature of a particular manufacturing process, the geometry of the part may differ from that of the tool surface used to form the part. And when a new tool is first tried out, it may be discovered that the part geometry does not match that of the master design of the part.

A physical characteristic of metal is its inherent elasticity. Some metals have greater elasticity than others. Steel for example typically has greater elasticity that aluminum. Drawing a flat metal sheet to a contoured shape stretches certain local regions of the sheet beyond the elastic limit to create plastic flow of material that causes the sheet to assume the contoured shape. Other regions of the material that are stretched only within the elastic limit will relax after the draw. Such relaxation is commonly referred to as springback.

One way to draw metal is by a stamping press that contains a stamping tool. The stamping tool includes a punch on a ram of the press and a die that sits on a bed of the press. A metal sheet disposed between the punch and the die will be drawn to a formed shape when the punch and die are pressed together. The formed shape is established by the shapes of working surfaces of the punch and die.

Because of metal springback, principles of metal stamping call for a tool to impart a certain degree of overbend into a draw to compensate for springback. Because of the complex contours of some stamped parts, clear definition of the regions where springback will occur and the extent of springback in such regions are often problematic before a new tool is first tried out. Hence, the successful design of a new tool may depend more on the judgment, skills, and past experiences of its designers, rather than on detailed engineering analyses and calculations, but even at that, a new tool must be tried out.

Tool tryout has historically been a time-consuming process, typically involving a succession of various operations by skilled workers, before the new tool is able to stamp a part with the required dimensional accuracy. For example, if a punch or die is found to require additional machining, such as milling, it must be removed from a tryout press, transported to a milling machine, fixtured in the milling machine and machined, transported back to the tryout press and re-loaded, and again tried out. Newly machined areas typically require refinishing and polishing. The handling of a tool for making a body panel is often cumbersome and time-consuming because of its large size and weight. Moreover, the steps just described may have to be repeated until design intent is finally achieved.

A stamping tool has to be maintained during use. It may become worn, or even break. Tool maintenance can also consume significant amounts of time. A reworked tool may have to be tried in a tryout press before it can return to production stamping.

Apparatus and methods that improve efficiency of making and maintaining a forming tool, such as a stamping tool, will have obvious benefit to industry.

SUMMARY OF THE INVENTION

The present invention relates to apparatus and methods for improving efficiency of making and maintaining forming tools.

Certain principles of the invention involve scanning using any of various known optical shape measuring techniques. A sensor, such as an optical shape measurement camera for example, is used to record views of an object from a number of different spatial locations. Although each individual view is two-dimensional in nature, the proper number and locations of the views can collectively define a three-dimensional shape for the object with a desired degree of resolution. Processing of the scanned views by a processor, such as in a computer system running known shape measurement programming, can then define, within the accuracy of the equipment, the three-dimensional shape of the object to a desired degree of resolution.

Principles of the present invention utilize these known technologies to capture images of a tool surface and a part formed by the tool surface. The images are processed by a computer system that runs known shape measurement programming to develop a set of data defining the three-dimensional shape of the tool surface and a set of data defining the three-dimensional shape of the formed part. Each set of data is then compared with the other to disclose differences between them. Such differences are indicative of springback in the case of stamped metal. The differences may be presented in any suitable format or medium. The data may even be processed for presentation as images on a visual display such as a monitor.

In similar fashion, the shape of the part is compared to the master design for the part. Significant enough differences are indicative of a need to re-work the tool. It is believed that the use of those differences in conjunction with information derived by comparing the tool surface geometry and the formed part geometry can aid skilled tool designers and makers in determining how best to re-work the tool so that it can form parts that are fully compliant with design intent represented by the master part geometry, thereby improving efficiency of the process of making the tool.

The shape of the tool may also be compared to the master design for the part and shape of successive re-works of the tool may be compared with each other to establish relationships of how the part shape changes in consequence of changes in the geometry of the tool. This can provide data useful in any further re-work of the tool and a history that can be used in the design of other tools.

The apparatus and method for improving efficiency of tool making processes and tool maintenance processes according to the present invention arise, at least in part, through the appreciation that optical scanning can be used as a practical technique for measuring both a tool and a formed part and of the availability of computer data processing equipment that can rapidly process large amounts of data, such as that generated in implementing an optical scanning process as a step in a method for ascertaining differences between the geometry of a forming tool and a part formed by the tool.

Individual pieces of commercially available equipment that have sufficient insensitivity to the surrounding environment such as that found in and around a tool room can be used in practice of the invention.

Stated in a general way, the invention relates to apparatus and method useful in a process of making and/or maintaining a surface of a tool used to form a part. It comprises a series of steps including scanning the tool surface with an optical shape measurement camera to obtain a first set of electronic images from different views of the tool surface and processing the electronic images to develop a first set of data defining the three-dimensional shape of the tool surface. It further comprises scanning the part surface of a part made by the tool with an optical shape measurement camera to obtain a second set of electronic images from different views of a surface of the part formed by the tool surface, and processing the electronic images of the second set of images to develop a second set of data defining the three-dimensional shape of the part surface. It further comprises processing two selected sets of three sets of data to develop a fourth set of data defining differences between the two selected sets of data. The third set of data defines the master shape of the part surface.

Another aspect of the invention relates to a method of making and/or maintaining a surface of a tool used to form a part comprising scanning the tool surface with an optical shape measurement camera to obtain electronic images from different views of the tool surface, processing the electronic images to develop a first set of data defining three-dimensional shape of the tool surface, and processing the first set of data with a second set of data having a correlation with the shape of the tool surface to develop a third set of data defining differences between the first and second sets of data.

Further aspects of the invention, and its various advantages and benefits, will be seen from the following detailed description of a presently preferred embodiment of the invention.

BRIEF DESCRIPTION OF THE DRAWINGS

The drawings that will now be briefly described are incorporated herein to illustrate a best mode presently contemplated for carrying out the invention.

DESCRIPTION OF THE PREFERRED EMBODIMENT

Figure 1:
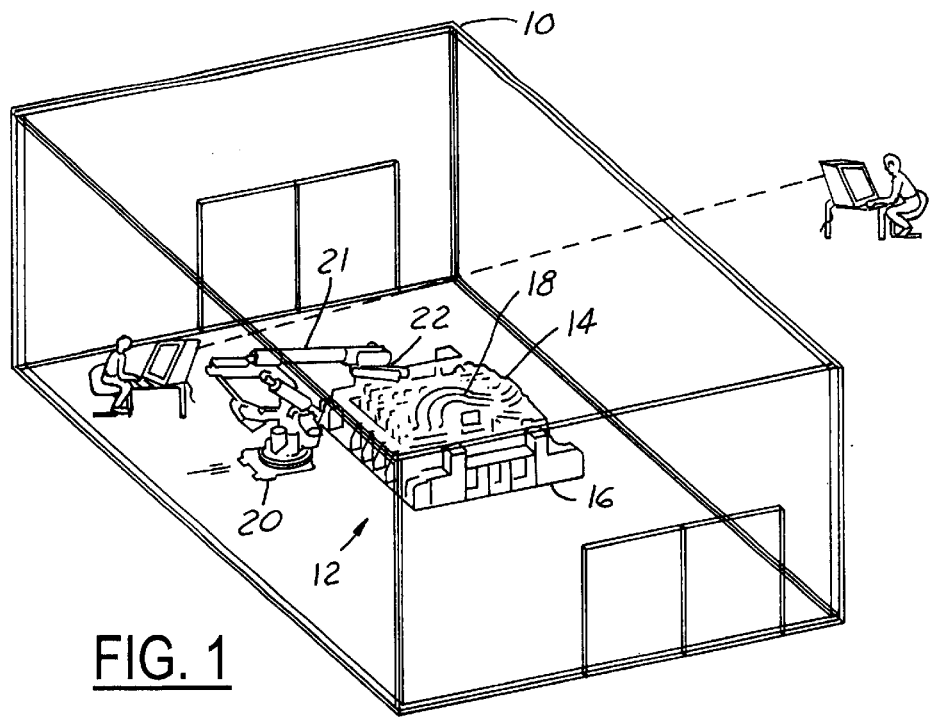
FIG. 1 is a perspective view of an exemplary environment for practice of certain aspects of the invention.

FIG. 1 illustrates a representative environment for carrying out a portion of a method according to principles of the present invention. It shows a scanning room 10 containing apparatus 12 for optical shape measurement of forming tools and parts formed by the tools. The inventive principles will be described in connection with a metal stamping tool on the understanding that those principles are generic to various forming tools. Room 10 may be located in a tool room set off from the work floor.

FIG. 1 shows one part 14 of a tool disposed on a bed, table, or other horizontal surface 16 such that a working surface 18 of part 14 faces in a suitable direction for scanning. In the case of a stamping tool for example, part 14 may be a die or punch, and in the illustrated example surface 18 faces vertically upward. Proximate surface 16 is a manipulator 20, such as a robot, having a positioning mechanism 21 that is capable of positioning an optical measurement camera shape camera 22 to various positions for viewing working surface 18.

An optical shape measurement system, of which camera 22 is a component part, can be any of various conventional systems. The example shown in the drawing comprises a single sensor that is electrically connected to a computer system for transmitting electronic images captured by the sensor to the computer system. The optical shape measurement system is operated to capture images defining the shape of working surface 18, or at least one or more areas of the working surface that are of interest, in different views. The captured images are processed by the computer system to develop spatial data defining the shape of either all or a portion of working surface 18. That data is sometimes referred to as a data point cloud.

Either before or after the scanning of surface 18, a part that has been stamped by the tool is also scanned to develop spatial data defining the shape of either all or a portion of its surface formed by the tool. The patent application referenced above describes a procedure for fixturing and scanning a stamped part.

The computer system also contains a memory for electronically storing a set of data defining a master shape (i.e., design intent) of the part. That data may be derived from a CAD (computer aided design) model of the part.

The processing of the aforementioned data sets provides data defining: A) differences between the stamped part and the part master shape; and B) differences between the stamped part and the tool working surface. The latter differences are indicative of springback that occurs in the part after stamping. The processing may also provide data defining: C) differences between the tool working surface and the part master shape;

If the differences between the stamped part and the part master shape are insignificant, the tool is working properly. If they are not, the tool needs to be re-worked in some way, in which case, the measurement of springback provided by the differences between the stamped part and the tool working surface can aid the tool designer and the tool maker in making a determination of how best to re-work the tool so that it will stamp a part matching the design intent.

Figure 2:
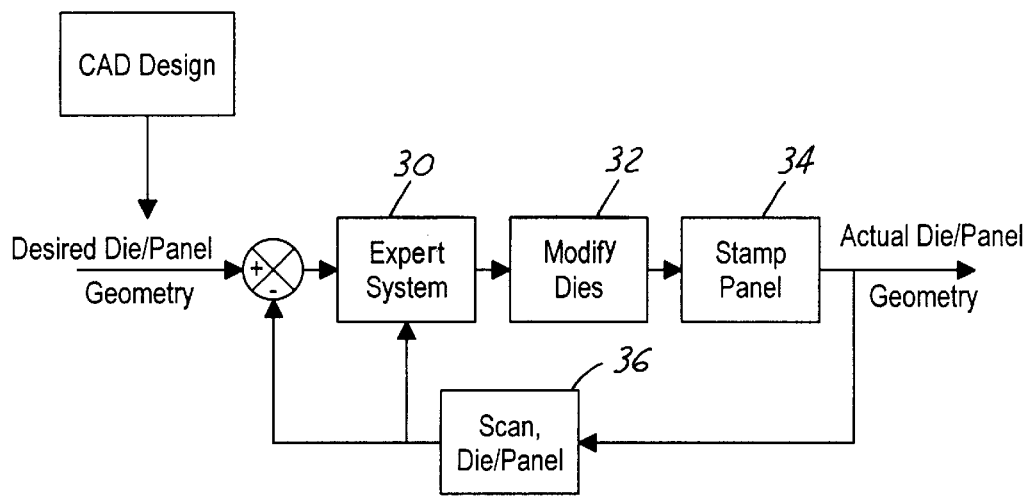
FIG. 2 is a diagram depicting general steps of the inventive method.

The process that has been described is depicted schematically in FIG. 2 as a series of steps 30, 32, 34, 36, beginning with part design (obtained from CAD data) and concluding with a finished tool that stamps a part to a shape conforming to design intent defined by the CAD data. The process iterates until the tool stamps a part meeting part design intent. Step 30, designated as expert system in the Figure, comprises a data base and algorithms that are useful in developing data defining the extent to which the tool working surfaces should be modified in order to stamp a part that meets design intent. The expert system may have an adaptive capability enabling it to learn from how a previously suggested tool modification changed the shape of the stamped part. The data base and algorithms may have specific or universal application depending on the nature of the particular tool and particular part.

Figure 3:
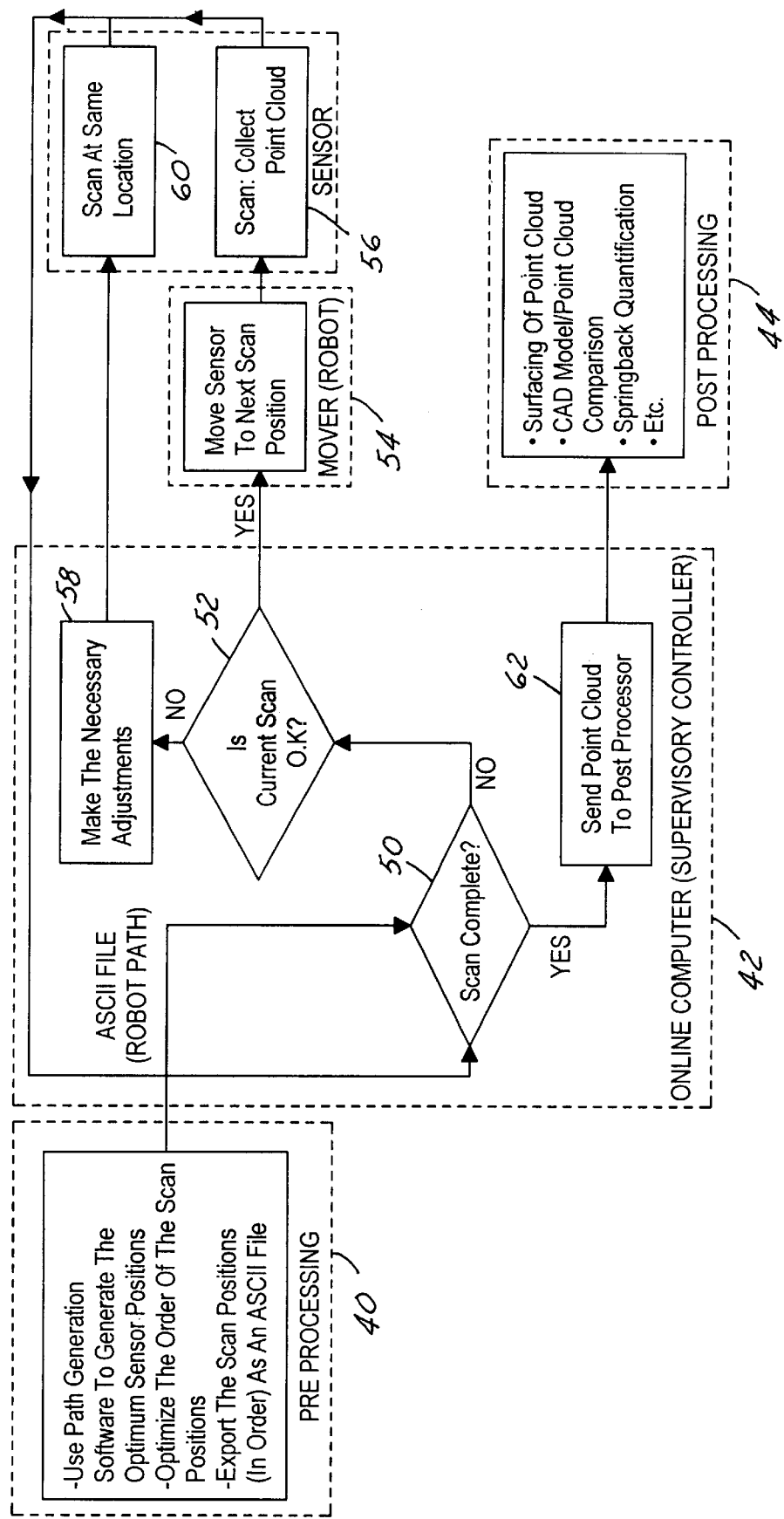
FIG. 3 is a diagram depicting more detail of the steps of the inventive method.

FIG. 3 discloses further detail of the iterative process. A pre-processing phase 40 precedes the part/tool scanning phase 42. The latter phase is followed by a post-processing phase 44.

Pre-processing phase 40 essentially comprises defining how the tool and part are to be scanned. It seeks to optimize the scanning process while assuring that all relevant areas will actually be scanned. It defines a scan path along which manipulator 20 is to move camera 22, and supplies that path as a file to the computer system that exercises supervisory control over scanning phase 42.

Part/tool scanning phase 42 comprises a number of steps 50, 52, 54, 56, 58, 60, 62 that constitute the scanning procedure described above. The steps include provision for checking the image of each scan to assure that factors such as scan angle and lighting did not impair the scan (step 52). If impairment is indicated, correction is made (step 58) and the scan is repeated (step 60). Ultimately, scanning phase 42 concludes upon the attainment of complete point clouds for both tool and stamped part.

Post-processing phase 44 process the point clouds from scanning phase 42 and the master shape data for the part to yield the results described above. Those results are used for further tool modification if needed, and they may also be used to update the expert system.

The invention also contemplates scanning of a tool as cast before any machining of the casting.

While a presently preferred embodiment has been illustrated and described, it is to be appreciated that the invention may be practiced in various forms within the scope of the following claims.

What is claimed is:

1. A method useful in a process of making and/or maintaining a surface of a tool used to form a part:
   a) scanning the tool surface with an optical shape measurement camera to obtain a first set of electronic images from different views of the tool surface;
   b) processing the electronic images to develop a first set of data defining the three-dimensional shape of the tool surface;
   c) scanning the part surface of a part made by the tool with an optical shape measurement camera to obtain a second set of electronic images from different views of a surface of the part formed by the tool surface;
   d) processing the electronic images of the second set of images to develop a second set of data defining the three-dimensional shape of the part surface;
   e) providing a third set of data defining a master part shape of the part surface; and
   f) processing two selected sets of the three sets of data to develop a fourth set of data defining differences between the two selected sets of data.

2. A method as set forth in claim 1 in which the step of processing two selected sets of the three sets of data to develop a fourth set of data defining differences between the two selected sets of data comprises processing the first set of data with the second set of data to develop the fourth set of data to define differences between the tool surface and the part surface.

3. A method as set forth in claim 2 including the steps of re-working the tool surface using the defined differences, making another part using the re-worked tool, scanning the re-worked tool surface to develop another first set of data, scanning the part made using the reworked tool surface to develop another set of second data, and processing the another set of first data and the another set of second data to define differences between the another set of first data and the another set of second data.

4. A method as set forth in claim 1 in which the step of processing two selected sets of the three sets of data to develop a fourth set of data defining differences between the two selected sets of data comprises processing the first set of data with the third set of data to develop the fourth set of data to define differences between the tool surface and the master shape of the part surface.

5. A method as set forth in claim 1 in which the step of processing two selected sets of the three sets of data to develop a fourth set of data defining differences between the two selected sets of data comprises processing the second set of data with the third set of data to develop the fourth set of data to define differences between the part surface and the master shape of the part surface.

6. A method as set forth in claim 1 in which the step of scanning the tool surface comprises moving a sensor to view the tool surface from a series of positions and directions pre-defined by a program contained in a supervisory controller that automatically controls the scanning process.

7. A method as set forth in claim 6 in which the scanning process includes a step for verifying adequacy of each image before the camera is moved to a different position and direction.

8. Apparatus useful in a process of making and/or maintaining a surface of a tool used to form a part comprising:
   a) an optical shape measurement system, including an optical shape measurement camera, for capturing electronic images defining a shape of an object;
   b) a manipulator comprising a positioning mechanism for moving the optical shape measurement camera relative to the tool surface to obtain electronic images of the tool surface from different views and relative to the part to obtain electronic images of the part surface formed by the tool surface from different views;
   c) a processing system for processing the electronic images to develop a first set of data defining three-dimensional shape of the tool surface, a second set of data defining three-dimensional shape of the part surface, and for processing two selected sets of three sets of data that consist of the first set, the second set, and a third set that defines a master part shape of the part surface to develop a fourth set of data defining differences between the two selected sets of data.

9. Apparatus as set forth in claim 8 in which the processing system processes the first set of data with the second set of data.

10. Apparatus as set forth in claim 8 in which the processing system processes the first set of data with the third set of data.

11. Apparatus as set forth in claim 8 in which the processing system processes the second set of data with the third set of data.

12. Apparatus as set forth in claim 8 including a supervisory controller for controlling the manipulator and camera to position the camera to viewing positions established by a predetermined path programmed in the supervisory controller.

13. Apparatus as set forth in claim 12 in which the supervisory controller verifies adequacy of each image before the camera is moved to a different position and direction.

14. A method of making and/or maintaining a surface of a tool used to form a part comprising:
   a) scanning the tool surface with an optical shape measurement camera to obtain electronic images from different views of the tool surface;
   b) processing the electronic images to develop a first set of data defining three-dimensional shape of the tool surface;
   c) scanning the part surface with an optical shape measurement camera to obtain electronic images from different views of the surface;
   d) processing the electronic images to develop a second set of data defining three-dimensional shape of the part surface; and
   e) processing the first set of data with the second set of data having a correlation with the shape of the tool surface to develop a third set of data defining differences between the first and second sets of data.

15. A method as set forth in claim 14 in which the step of processing the first set of data with a second set of data having a correlation with the shape of the tool surface to develop a third set of data defining differences between the first and second sets of data comprises processing the first set of data with a set of data defining the master part shape of the part surface.

16. A method as set forth in claim 14 in which the step of processing the first set of data with a second set of data having a correlation with the shape of the tool surface to develop a third set of data defining differences between the first and second sets of data comprises processing the first set of data with a set of data defining shape of the tool surface after re-working of the tool surface.

17. A method as set forth in claim 14 including compiling the data sets as a historical record for use in making and/or maintaining other tools.

* * * * *